United States Patent [19]

Brodoway

[11] 4,307,007
[45] Dec. 22, 1981

[54] ANTISTICKING AND ANTIBLOCKING ELASTOMERIC COMPOSITIONS COMPRISING COPOLYMERS OF ETHYLENE, ALKYL ACRYLATES, AND HALF ESTERS OF 1,4 BUTENEDIOIC ACID AND ORGANIC ACID PHOSPHATES

[75] Inventor: Nicolas Brodoway, Claymont, Del.

[73] Assignee: E. I. Du Pont de Nemours and Company, Wilmington, Del.

[21] Appl. No.: 180,468

[22] Filed: Aug. 22, 1980

[51] Int. Cl.³ .......................... C08K 5/49; C08K 5/52
[52] U.S. Cl. .................................. 260/30.6 R; 525/2; 526/318
[58] Field of Search ...................... 260/30.6 R; 525/2; 526/318

[56] References Cited

U.S. PATENT DOCUMENTS

| | | | |
|---|---|---|---|
| 3,050,487 | 8/1962 | Solomon | 260/30.6 R |
| 3,474,058 | 10/1969 | Ridgeway et al. | 260/30.6 R |
| 3,821,179 | 6/1974 | Powell | 525/6 |
| 3,904,588 | 9/1975 | Greene | 525/328 |
| 4,057,672 | 11/1977 | Creekmore et al. | 260/30.6 R |
| 4,112,158 | 9/1978 | Creekmore et al. | 525/6 |

FOREIGN PATENT DOCUMENTS 51-1010856  1/1976  Japan ..................................... 525/2

OTHER PUBLICATIONS

"Zelec", Jan. 1978, #16520, An Improved Release System for Ethylene Alkyl Acrylate Elastomers.
"Zelec", UN Release Agent for Compounds of Vamac, Hagman, 3-78.

*Primary Examiner*—Herbert J. Lilling

[57] ABSTRACT

The antisticking and antiblocking properties of ethylene/methyl or ethyl acrylate/1,4-butenedioic acid monoalkyl ester terpolymers is improved by mixing with said terpolymer a small quantity of a $C_{12}$–$C_{24}$ straight chain alkyl or alkenyl acid phosphate or a $C_{12}$–$C_{24}$ straight chain alkyl- or alkenyloxypoly(ethyleneoxy) acid phosphate.

8 Claims, No Drawings

ANTISTICKING AND ANTIBLOCKING ELASTOMERIC COMPOSITIONS COMPRISING COPOLYMERS OF ETHYLENE, ALKYL ACRYLATES, AND HALF ESTERS OF 1,4 BUTENEDIOIC ACID AND ORGANIC ACID PHOSPHATES

DESCRIPTION

Technical Field

This invention relates to compositions containing elastomeric random copolymers derived from ethylene, an alkyl acrylate, and a monoalkyl ester of 1,4-butenedioic acid. In particular, this invention relates to compositions containing such elastomeric random copolymers with significantly improved antisticking and antiblocking characteristics. Vulcanizates of such elastomeric copolymers can be used in a wide variety of industrial applications, including ignition wire jacketing, spark plug boots, hose, belts, seals and gaskets. Good low and high temperature physical properties and excellent oil resistance make these elastomers particularly well suited for automotive applications.

Background Art

U.S. Pat. No. 3,904,588, granted Sept. 9, 1975, to Greene, discloses and claims certain ethylene/alkyl acrylate/carboxylic acid elastomeric terpolymers which have certain particularly desirable properties. In particular, Greene is directed to elastomeric terpolymers derived from ethylene, methyl or ethyl acrylate, and an alkyl ester of 1,4-butene-dioic acid, which terpolymer possesses exceptional oil resistance and low temperature properties that render it particularly suitable for certain industrial applications. Greene discloses polymers which can be improved by the present invention. Accordingly, the disclosure of U.S. Pat. No. 3,904,588 relevant to making and using such copolymers is hereby incorporated by reference.

Disclosure of the Invention

The present invention relates to elastomeric compositions containing copolymer derived from ethylene, alkyl acrylates and monoalkyl esters of 1,4-butenedioic acid, and the improvement of certain properties of such polymers. In particular, the present invention relates to improved elastomeric compositions of the type described generally above, and in more detail below, to the process of preparing such improved elastomeric compositions, and to articles made from such improved elastomeric compositions.

Such ethylene/alkyl acrylate copolymers can be very tacky on a mill at 50° C. and stick to both rolls at this temperature. The copolymers are, thus, very difficult to isolate and package and to process after compounding. Pellets of copolymer also have a tendency to stick together (i.e., block) and foul processing equipment in the finishing steps of manufacture.

Good release from mill rolls, molds and other processing equipment has heretofore been obtained in such ethylene/alkyl acrylate copolymers by inclusion of small amounts of both octadecylamine and stearic acid. For example, the roll temperature at which a soft ethylene/alkyl acrylate stock can be cut from a mill is raised considerably by the addition of 0.5 phr of octadecylamine and 5 phr of stearic acid without any adverse effect on the cure state. Even higher stock temperatures (ca. 25° C. higher) can be tolerated by adding from 0.5 to 3 phr of "Zelec" UN (sold by E. I. du Pont de Nemours and Company) or "Vanfre" UN (sold by Vanderbilt Chemical Corporation) to the octadecylamine/stearic acid release system. "Zelec" UN and "Vanfre" UN consist of a mixture of fatty alcohol esters of orthophosphoric acid containing a major amount of n-decyl ($C_{10}$) acid phosphate and minor amounts of the homologous n-octyl ($C_8$) and n-dodecyl ($C_{12}$) acid phosphates. "Zelec" UN, however, lacks the requisite antiblocking properties when used in such ethylene/alkyl acrylate copolymers. Slabs of such copolymer stock actually fuse together and cannot be readily separated after storage overnight at room temperature. Moreover, the unpleasant odor of n-octanol present when "Zelec" UN or "Vanfre" UN is used can create problems, particularly when large quantities of hot stocks are handled in poorly ventilated areas.

It has been found that the antisticking properties and especially the antiblocking properties of the elastomeric terpolymers of the general type described by Greene in U.S. Pat. No. 3,904,588 can be significantly improved by incorporating into such elastomeric copolymers a small quantity of certain acid phosphate release agents. More specifically, it has been found that sticking and especially blocking can be minimized or eliminated in elastomeric copolymers derived from ethylene, alkyl acrylates, and monoalkyl esters of 1,4-butenedioic acid by incorporating into such copolymers a small quantity (0.1–10 parts per 100 parts of copolymer) of a $C_{12}$–$C_{24}$ straight-chain alkyl or alkenyl acid phosphate and/or a $C_{12}$–$C_{24}$ straight-chain alkyl- or alkenyloxypoly(ethyleneoxy) acid phosphate containing from 1 to 4 ethyleneoxy groups. This is accomplished without significantly adversely affecting the superior heat aging properties and compression set of Greene's terpolymers.

By "antisticking" is meant the ability to resist the tendency of a polymer to stick to the surfaces of rubber processing equipment such as the rolls of a rubber mill. When the polymer has poor antisticking characteristics the polymer will have to be removed with more than the usual force and/or will have to be removed in several pieces rather than in a single continuous sheet or lump.

By "antiblocking" is meant the ability to resist the tendency of a polymer to stick to itself when left at ambient temperature, such as in warehouse storage.

The elastomeric copolymer compositions of the present invention provide excellent release from mill rolls, molds and hot processing equipment. Normal mixing and sheeting off of the copolymer can be readily obtained without sticking to the hot rolls even at mill temperatures of up to 120° C. More importantly, the compositions of the present invention possess excellent antiblocking properties, i.e., they resist the tendency of the polymer to fuse together during the finishing steps of manufacture. In addition, the unpleasant odor of n-octanol which results from the use of "Zelec" UN or "Vanfre" UN is completely eliminated.

The monoalkyl ester of 1,4-butenedioic acid functions as a cure-site monomer and comprises from 0.5 to 10 weight percent of the copolymer. The alkyl group contains from 1 to 6 carbon atoms. Both cis- and trans-1,4-butenedioic acid, i.e., maleic and fumaric acids, can be used. Methyl hydrogen maleate, propyl hydrogen maleate and ethyl hydrogen maleate are preferred, with the latter most preferred. The alkyl acrylate component can be either methyl acrylate or ethyl acrylate and comprises from about 40 to 62 weight percent, preferably 52 to 58 percent, of the copolymer. Methyl acrylate is preferred. Ethylene is present in a complemental amount, i.e., 28 to 59.5 percent. A particularly preferred copolymer for use in this invention comprises by weight 38.5 to 43.5% of ethylene, 53 to 57% of methyl acrylate and 3.5 to 4.5% of ethyl hydrogen maleate.

The alkyl and alkenyl phosphate esters which are used in this invention are well-known in the art and many are commercially available. They can be conveniently prepared by the reaction of the appropriate alkyl or alkenyl alcohol, or alkyl- or alkenyloxypoly(ethyleneoxy) alcohol with phosphorus pentoxide as described in "Organic Phosphorus Compounds", by G. M. Kosolapoff and L. Maier, Volume 6, pages 222–4, Wiley-Interscience, New York, 1973. A mixture of mono- and diacid phosphates is formed according to the following equation:

$$3ROH + P_2O_5 \rightarrow (RO)PO_3H_2 + (RO)_2PO_2H$$

It is understood that mixtures of the mono- and diacid phosphates can be used in this invention.

The amount of alkyl or alkenyl phosphate ester in the compositions of the present invention is from 0.10 to 10 parts, preferably 0.25 to 3 parts, per 100 parts of copolymer.

The alkyl or alkenyl group in the phosphate ester used in the compositions of the present invention must be straight-chained. Phosphate esters containing branched long-chain alkyl or alkenyl groups or alkyl- or alkenylphenoxy groups give ethylene/acrylate elastomer compositions which have inferior antiblocking properties. The number of carbon atoms present in the alkyl or alkenyl portion of the ester can range from 12 to 24 and the number of ethyleneoxy groups, if present, ranges from 1 to 4.

Specific examples of alkyl and alkenyl phosphate esters which can be used in this invention include the following:

eicosyl acid phosphate ($C_{20}$)
eicosyloxydi(ethyleneoxy) acid phosphate ($C_2$)
dodecyl acid phosphate ($C_{12}$)
tetradecyl acid phosphate ($C_{14}$)
docosyl acid phosphate ($C_{22}$)
octadecyl acid phosphate ($C_{18}$)
cis-9-octadecenyl acid phosphate ($C_{18}$ unsaturated)
pentadecyl acid phosphate ($C_{15}$)
heneicosyl acid phosphate ($C_{21}$)
pentadecyloxytetra(ethyleneoxy) acid phosphate ($C_{15}$)
tridecyloxytri(ethyleneoxy) acid phosphate ($C_{13}$)
tetracosyl acid phosphate ($C_{24}$)

Dodecyl acid phosphate and eicosyloxydi(ethyleneoxy) acid phosphate are preferred alkyl phosphate esters for use in the compositions of the present invention.

Thus the compositions of the present invention comprise an elastomeric copolymer derived from component monomers consisting essentially of:
(a) at least one compound selected from the group consisting of methyl acrylate and ethyl acrylate,
(b) at least one monoalkylester of 1,4-butenedioic acid, wherein said alkyl moiety contains 1-6 carbon atoms, and
(c) ethylene, and 0.1–10 parts per 100 parts of said copolymer of at least one phosphate ester selected from the group consisting of $C_{12}$–$C_{24}$ straight chain alkyl and alkenyl acid phosphates and $C_{12}$–$C_{24}$ straight chain alkyl- and alkenyloxypoly(ethyleneoxy) acid phosphates containing 1–4 ethyleneoxy groups, preferably wherein the copolymer consists essentially of 40–62 weight percent acrylate, 0.5–10 weight percent of said cure site monomer, and 28–59.5 weight percent ethylene, preferably wherein the phosphate ester comprises 0.25–3 phr of the composition, preferably where the cure site monomer is ethyl hydrogen maleate, more preferably wherein the copolymer consists essentially of 53–57 weight percent methyl acrylate, 3.5–4.5 weight percent ethyl hydrogen maleate and 38.5–43.5 weight percent ethylene and wherein the phosphate ester is eicosyloxydi(ethyleneoxy) acid phosphate and comprises about one phr of the composition.

The following examples serve to illustrate specific embodiments of the present invention and provide comparisons with compositions outside the scope of the present invention, i.e., compositions containing no phosphate ester release agent as well as compositions containing phosphate esters other than those defined herein. All parts and percentages are by weight unless specified otherwise.

EXAMPLE 1

Slabs (25 mm×125 mm×2 mm) of a 38.5 to 43.5% ethylene/53–57% methyl acrylate/3.5–4.5% ethyl hydrogen maleate copolymer were prepared by compression molding between sheets made from Teflon TFE fluorocarbon resin for two minutes at 120° C. and 200 MPa pressure. After cooling to room temperature the Teflon ® sheets were removed. The slabs were overlapped by 25 mm, pressed together, and allowed to stand at 20° C. for 18 hours. Attempts to manually peel the slabs apart caused tearing of the stock showing the strong blocking nature of the copolymer with no phosphate ester release agent.

EXAMPLE 2

Two-hundred part portions of the copolymer described in Example 1 were mixed on a rubber mill at 30° C. with 0.5, 1 and 2 phr, respectively, of eicosyloxydi(ethyleneoxy) acid phosphate. In each case, after the stocks were thoroughly mixed, mill temperature was increased until the copolymer stuck to the mill. All three stocks containing the eicosyloxydi(ethyleneoxy) acid phosphate were milled and cut with good release from the mill at 120° C. Copolymer not containing the alkyl acid phosphate stuck to the mill at 50° C. Slabs of copolymer containing the alkyl acid phosphate were prepared and peel tested as described in Example 1 above. These slabs could be peeled apart easily with no evidence of blocking at 20° C.

EXAMPLES 3–12

Slabs of copolymer were prepared according to the procedure of Examples 1 and 2 using 1 phr each of a number of structurally different alkyl phosphate esters. Slabs were overlapped and peel tested at 20° C. and after heating in an oven at 50° C. for one hour. Results are given in Table I.

Except for Example 4, all of the acid phosphates consisted of mixtures of mono- and diacid phosphates. The acid phosphate used in Example 4 is described as "high mono stearyl acid phosphate" by the manufacturer (Hooker Chemical Co.).

TABLE I

| Example No. | Alkyl Acid Phosphate Antiblocking Agent | Peel 20° C. | Test[1] 50° C. |
|---|---|---|---|
| 3 | $CH_3(CH_2)_{11}OPO_3H_2$ | p.r. | v.t. |
| 4 | $CH_3(CH_2)_{17}OPO_3H_2$ | p.r. | v.t. |
| 5 | $CH_3((CH_2)_{14}O(CH_2CH_2O)_4PO_3H_2$ | p.r. | v.t. |
| 6 | $CH_3(CH_2)_7CH=CH(CH_2)_8OPO_3H_2$ | p.r. | v.t. |
| 7 | $CH_3(CH_2)_9OPO_3H_2$ | p.w.d. | f. |
| 8 | $CH_3CH(CH_3)(CH_2)_6OPO_3H_2$ | f. | f. |
| 9 | $CH_3(CH_2)_3CH(C_2H_5)CH_2O(CH_2CH_2O)_{1.5}PO_3H_2$ | f. | f. |
| 10 | $CH_3(CH_2)_3CH(C_2H_5)CH_2O(CH_2CH_2O)_3—PO_3H_2$ | f. | f. |
| 11 | $CH_3(CH_2)_3CH(CH_3)O(CH_2CH_2O)_2PO_3H_2$ | f. | f. |
| 12 | $C_9H_{19}—C_6H_4O(CH_2CH_2O)_xPO_3H_2$ | f. | f. |

[1]p.r. = peels readily; p.w.d. = peels with difficulty; v.t. = very tacky; f. = fused The results show that the compositions of the present invention (Examples 3–6) effectively eliminate polymer blocking at 20° C. Although some tackiness was observed at 50° C., the slabs could still readily be pulled apart. In contrast, the compositions outside the scope of the present invention Examples 7–12 fused together and could not be peeled apart under similar conditions.

EXAMPLES 13–24

Two-hundred part portions of the copolymer described in Example 1 were mixed on a rubber mill at 30° C. with a number of structurally different alkyl acid phosphates and in the amounts given in Table II. Slabs (75 mm × 150 mm × 2 mm) were prepared from each of the stocks by compression molding between sheets of canvas duck and Teflon® TFE fluorocarbon resin sheet for two minutes at 120° C. and 200 MPa pressure. Strips 6.35 mm wide and 76 mm long were cut from the slabs and the surfaces were kept covered with the Teflon® sheet. The tack developed between slabs was measured using a Monsanto "Tel-Tak" tack tester after removal of the Teflon® sheet and subsequent aging of the uncovered surface by exposure to air for one hour and 72 hours. The test was conducted by clamping strips at right angles to each other and pressing them together for one minute under a pressure of 55.2 kPa. The strips were then pulled apart at a constant rate and the maximum stress was recorded. Results are given in Table II.

Except for Example 17, all of the acid phosphates consisted of mixtures of mono- and diacid phosphates. The acid phosphate used in Example 17 is described as "high mono stearyl acid phosphate" by the manufacturer (Hooker Chemical Co.)

TABLE II

| Ex. No. | Alkyl Acid Phosphate Antiblocking Agent (phr) | Tack Strength in kPa after surface exposure to air for | |
|---|---|---|---|
| | | 1 hour | 72 hours |
| Control | None | 326[1] | 357[1] |
| 13 | $CH_3(CH_2)_{19}O(CH_2CH_2O)_2PO_3H_2$ (2) | 125 | 74 |
| 14 | $CH_3(CH_2)_{19}O(CH_2CH_2O)_2PO_3H_2$ (1) | 112 | 74 |
| 15 | $CH_3(CH_2)_{19}O(CH_2CH_2O)_2PO_3H_2$ (0.5) | 208 | 63 |
| 16 | $CH_3(CH_2)_{11}OPO_3H_2$ (1) | 152 | 74 |
| 17 | $CH_3(CH_2)_{17}OPO_3H_2$ (1) | 293[1] | 75 |
| 18 | $CH_3(CH_2)_{14}O(CH_2CH_2O)_4PO_3H_2$ (1) | 137 | 40 |
| 19 | $CH_3(CH_2)_{12}O(CH_2CH_2O)_3PO_3H_2$ (1) | 242 | 143 |
| 20 | $CH_3(CH_2)_7CH=CH(CH_2)_8OPO_3H_2$ (1) | 143 | 57 |
| 21 | $CH_3(CH_2)_9OPO_3H_2$ (1) | 243[1] | 146 |
| 22 | $CH_3(CH_2)_3CH(C_2H_5)CH_2O—(CH_2CH_2O)_{1.5}PO_3H_2$ (1) | 212 | 164 |
| 23 | $CH_3(CH_2)_3CH(C_2H_5)CH_2O—(CH_2CH_2O)_3PO_3H_2$ (1) | 228[1] | 177 |

TABLE II-continued

| Ex. No. | Alkyl Acid Phosphate Antiblocking Agent (phr) | Tack Strength in kPa after surface exposure to air for | |
|---|---|---|---|
| | | 1 hour | 72 hours |
| 24 | $CH_3CH(CH_3)(CH_2)_6OPO_3H_2$ (1) | 335[1] | 259 |

[1]Values were obtained on samples that were fused together.

In general, the compositions of the present invention (Examples 13 to 20) demonstrated appreciably reduced blocking tendency as evidenced by the observed much lower tack strengths as compared with the control example. This was particularly evident after exposure of the polymer stock to air for 72 hours. In contrast, comparative Examples 21–24 exhibited higher tack strengths and thus increased polymer blocking under similar conditions.

INDUSTRIAL APPLICABILITY

The elastomeric polymers of the present invention can be used in substantially the same industrial applications as can the elastomeric polymers of Greene, including ignition wire jacketing, spark plug boots, hose, belts, miscellaneous molded boots, seals, and gaskets. The good low and high temperature physical properties and excellent oil resistance make these elastomers particularly well suited for automotive applications.

BEST MODE

Although the best mode of the present invention, i.e., the single best composition of the present invention, will depend upon the particular desired end use and the specific requisite combination of properties for that use, the single most preferred composition of the present invention is that described in detail in Example 14.

I claim:

1. A composition comprising an elastomeric copolymer derived from component monomers consisting essentially of:
   (a) at least one compound selected from the group consisting of methyl acrylate and ethyl acrylate,
   (b) at least one monoalkylester of 1,4-butenedioic acid, wherein said alkyl moiety contains 1–6 carbon atoms, and
   (c) ethylene, and 0.1–10 parts per 100 parts of said copolymer of at least one phosphate ester selected from the group consisting of $C_{12}$–$C_{24}$ straight chain alkyl and alkenyl acid phosphates and $C_{12}$–$C_{24}$ straight chain alkyl- and alkenyloxypoly(ethyleneoxy) acid phosphates containing 1–4 ethyleneoxy groups.

2. The composition of claim 1 wherein the acrylate component of the copolymer comprises 40–62 weight percent, the monoalkyl ester of 1,4-butenedioic acid comprises 0.5–10 weight percent, and the ethylene comprises a complemental amount.

3. The composition of claim 1 wherein the phosphate ester is present in an amount of 0.25–3 parts per 100 parts of said copolymer.

4. The composition of claim 1 wherein the monoalkyl ester of 1,4-butenedioic acid is ethyl hydrogen maleate.

5. The composition of claim 4 wherein the acrylate is methylacrylate and comprises 53–57 weight percent of the copolymer and the ethyl hydrogen maleate units comprise 3.5–4.5 weight percent of the copolymer.

6. The composition of claim 1 wherein the alkyl phosphate ester is selected from the group consisting of dodecyl acid phosphate, eicosyloxydi(ethyleneoxy) acid phosphate, and mixtures of the same.

7. The composition of claim 5 wherein phosphate ester is eicosyloxydi(ethyleneoxy) acid phosphate and is present in an amount of about 1 part per 100 parts of the copolymer.

8. A method of improving the antisticking and antiblocking properties of an elastomeric copolymer derived from component monomers consisting essentially of:
   (a) at least one compound selected from the group consisting of methyl acrylate and ethyl acrylate,
   (b) at least one monoalkylester of 1,4-butenedioic acid, wherein said alkyl moiety contains 1–6 carbon atoms, and
   (c) ethylene, said method comprising mixing with said copolymer 0.1–10 parts per 100 parts of said copolymer of at least one phosphate ester selected from the group consisting of $C_{12}$–$C_{24}$ straight chain alkyl or alkenyl acid phosphates and $C_{12}$–$C_{14}$ straight chain alkyl- or alkenyloxypoly(ethyleneoxy) acid phosphates.

* * * * *